July 22, 1958   R. R. TURNER   2,843,926
METHOD OF FORMING A SUPPLY TUBE
Filed Dec. 24, 1954
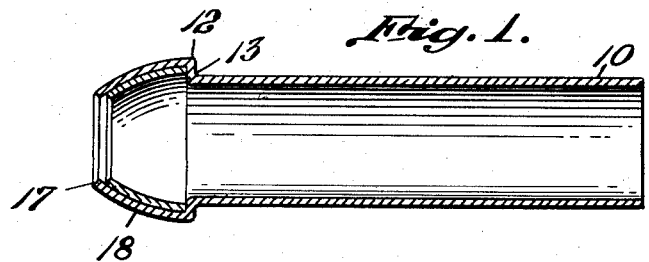
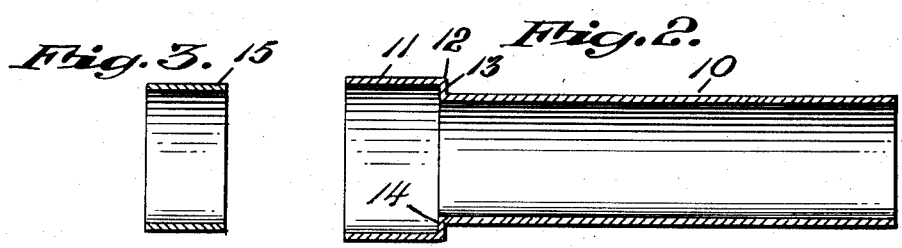
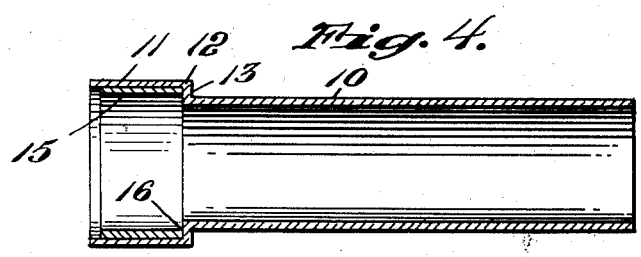
INVENTOR.
Ralph R. Turner
BY Barlow & Barlow
ATTORNEYS.

United States Patent Office 2,843,926
Patented July 22, 1958

2,843,926

METHOD OF FORMING A SUPPLY TUBE

Ralph R. Turner, Warwick, R. I., assignor to United Wire & Supply Corporation, a corporation of Rhode Island Application December 24, 1954, Serial No. 477,539

2 Claims. (Cl. 29—511)

This invention relates to a method of making a supply tube which may be used in connection with the plumbing of bathrooms, such for instance as in lavatories and the like, where there is a conical seat junction between two water conduits.

Heretofore tubing has been expanded at one end and tapered for the purposes of fitting into an internally flared end of a conduit with which it was to be detachably engaged. In cases where the tubing is composed of a thin wall tube, reinforcing of that tubing has been found desirable, and a screw machine brass member of a desired shape has been inserted in an enlarged end portion of a tubing and then the tubing swedged over the brass insert. This has been an expensive manner of reinforcing the enlarged end of tubing in this connection.

One of the objects of this invention is to provide a method of strengthening the enlarged end of a tubing at a materially reduced cost.

Another object of this invention is to eliminate the necessity of a screw machine part for reinforcing the enlarged end of a tubing.

A more specific object of this invention is to assemble the reinforcing structure and the tubing and then shape both the reinforcement and the enlarged end of the tubing at the same time and in one operation.

With these and other objects in view, the invention consists of certain novel features of construction as will be more fully described and particularly pointed out in the appended claims.

In the accompanying drawings:

Figure 1 is a sectional view of the enlarged end of a tubing reinforced in accordance with this invention;

Figure 2 is a sectional view showing the first step in the operation of enlarging the end of the tubing;

Figure 3 is a sectional view showing the sleeve prior to its insertion in the enlarged end of the tube;

Figure 4 is a sectional view showing the sleeve located in the enlarged end of the tube but before the same is swedged to the shape shown in Figure 1.

In proceeding with this invention, I enlarge the end of a tube, such for instance as a non-ferrous tube, by expanding the end portion thereof and then insert a sleeve which closely fits within the enlarged end and then reduce this enlarged end and sleeve along a taper which may be convex longitudinally on its outer surface to finish the tube and lock the sleeve in position.

With reference to the drawings, the numeral 10 designates a section of a drawn seamless tube of uniform diameter. The first step in the operation upon the tube is to expand the end portion 11 of the tube which provides a laterally projecting portion 12 extending radially outwardly in all directions from the diameter of the tube 10 and forms an external annular shoulder at 13 and an internal shoulder at 14. The expanded portion 11 of the tube is cylindrical in cross section and corresponds, except on a larger area, to the cross section of the cylindrical portion 10 of the tube which is usually drawn to a desired size.

A sleeve 15 shown in Figure 3 is of uniform thickness, being a tube section, and has an external diameter substantially equal to the internal diameter of the cylindrical enlarged portion 11. It is placed within this cylindrical portion 11 as shown in Figure 4 with its end portion 16 substantially engaging the shoulder 14. Then by swedging, spinning, or some suitable reducing step, the cylindrical portion 11 and the sleeve 15 are together tapered or contracted from the periphery of the shoulder 13 to the end 17 of the tube along an outwardly convex surface 18 as may be seen in Figure 1. By this arrangement both the reinforcement 15 and the enlarged portion 11 are reduced at one time, and the sleeve becomes locked in position and yet is of such frustro-conical shape as to provide a very strong reinforcement for the enlarged end of the tube. The convex portion 18 will be finished in this operation and need no further work be performed upon it.

I claim:

1. The method of forming the end portion of a supply tube which comprises expanding to cylindrical form and uniform thickness the end portion of a cylindrical tube thus providing a shoulder between the expanded and nonexpanded portions of the tube, inserting into the expanded portion and against said shoulder a cylindrical sleeve of uniform thickness and having an outer diameter substantially the inner diameter of the expanded portion, and then reducing both the expanded portion and sleeve simultaneously while maintaining the uniform combined thickness to provide an axially extending taper with its smaller diameter at the end of the tube.

2. The method of claim 1 wherein the taper is outwardly convex in longitudinal section as formed.

References Cited in the file of this patent

UNITED STATES PATENTS

| | | |
|---|---|---|
| 155,128 | Ward | Sept. 15, 1874 |
| 819,340 | Coe | May 1, 1906 |
| 1,673,425 | Schwartz | June 12, 1928 |
| 1,783,927 | Rieke | Dec. 2, 1930 |
| 2,167,654 | Hothersall | Aug. 1, 1939 |
| 2,325,564 | Westin | July 27, 1943 |
| 2,504,448 | Rachlin | Apr. 18, 1950 |
| 2,516,689 | France et al. | July 25, 1950 |
| 2,679,681 | Resler | June 1, 1954 |
| 2,715,766 | Ricks | Aug. 23, 1955 |